(12) United States Patent
Schulz et al.

(10) Patent No.: US 6,680,042 B1
(45) Date of Patent: Jan. 20, 2004

(54) METHOD OF RAPIDLY CARRYING OUT A HYDROGENATION OF A HYDROGEN STORAGE MATERIAL

(75) Inventors: Robert Schulz, Ste-Julie (CA); Salim Bouaricha, Longueuil (CA); Jacques Huot, Boucherville (CA); Daniel Guay, St-Lambert (CA)

(73) Assignee: Hydro-Quebec, Montreal (CA)

( * ) Notice: Subject to any disclaimer, the term of this patent is extended or adjusted under 35 U.S.C. 154(b) by 0 days.

(21) Appl. No.: 09/706,809

(22) Filed: Nov. 7, 2000

(51) Int. Cl.[7] .............................. C01B 6/00; C01B 6/04; C01B 6/24
(52) U.S. Cl. ...................... 423/644; 423/645; 423/646; 423/647; 423/658.2
(58) Field of Search .............................. 423/658.2, 645, 423/646, 647, 644

(56) References Cited

U.S. PATENT DOCUMENTS

| | | | | |
|---|---|---|---|---|
| 4,300,946 A | * | 11/1981 | Simons | 423/658.2 |
| 4,304,593 A | * | 12/1981 | Maeland | 423/658.2 |
| 4,402,933 A | * | 9/1983 | de Pous | 423/658.2 |
| 4,431,561 A | * | 2/1984 | Ovshinsky et al. | 423/658.2 |
| 4,555,395 A | * | 11/1985 | Sirovich et al. | 423/658.2 |
| 4,839,085 A | * | 6/1989 | Sandrock et al. | 423/658.2 |
| 5,069,894 A | * | 12/1991 | Bogdanovic | 423/658.2 |
| 5,198,207 A | | 3/1993 | Knott et al. | 423/647 |
| 5,199,972 A | * | 4/1993 | Bogdanovic | 423/658.2 |
| 5,872,074 A | | 2/1999 | Schulz et al. | 502/328 |
| 6,080,381 A | * | 6/2000 | Zaluska et al. | 423/658.2 |
| 6,251,349 B1 | * | 6/2001 | Zaluska et al. | 423/685.2 |
| 6,478,844 B1 | * | 11/2002 | Ovshinsky | 423/647 |
| 6,572,836 B1 | * | 6/2003 | Schulz et al. | 423/657 |

OTHER PUBLICATIONS

A. Zaluska, et al., "Sodium Alanates for reversible hydrogen storage", Centre for the Physics of Materials Of Physics, McGill University, Montreal, Quebec, Canada, Elsevier Science, SA, Jnl. of Alloys and Compounds 298 (2000), pp. 125–134.

Ekkehard Bartmann et al., "Active Magnesium from Catalytically Prepared Magnesium Hydride or from Magnesium Anthracene and its Uses in the Synthesis[1)]", Chem. Ber, vol. 123, pp. 1517–1528, 1990 (no month).

Y. Chen et al., "Formation of metal hydrides by mechanical alloying.", Journal of Alloys and Compounds, vol. 217, pp. 181–184, 1995, (no month).

J. L. Bobet et al., "Synthesis of magnesium and titanium hydride via reactive mechanical alloying Influence of 3d–metal addition on $MgH_2$ synthesize.", Journal of Alloys and Compounds vol. 298, pp. 279–284, 2000, (no month).

Hayao Imamura et al., "Hydriding–dehydriding behavior or magnesium composites obtained by mechanical grinding with graphite carbon.", International Journal of Hydrogen Energy, vol. 25, pp. 837–843, 2000, (no month).

Hayao Imamura et al., "Characterization and hydriding properties of Mg–graphite composites prepared by mechanical grinding as new hydrogen storage materials.", Journal of Alloys and Compounds, vol. 253–254, pp. 34–37, 1997, (no month).

Hayao Imamura et al., "Hydrogen absorption of Mg–Based composites prepared by mechanical milling: Factors affecting its characteristics.", Journal of Alloys and Compounds vol. 232, pp. 218–223, 1996, (no month).

Hiroshi Inoue et al., "Effect of ball–milling on electrochemical and physicochemical characteristics of crystalline $Mg_2Ni$ alloy.", Electrochimica Acta, vol. 43, Nos. 14–15, pp. 2215–2219, 1998, (no month).

Chiaki Iwakura et al., "Surface modification of MgNi alloy with graphite by ball–milling for use in nickel–metal hydride batteries.", Chem. Commun., pp. 1831–1832, 1996, (no month).

Hayao Imamura, Takashi Nobunage and Susumu Tsuchiya; Application of Organic Compounds to Metal–Hydrogen Systems as a Technique for Improving Sorption Properties: A New Class of Hydrogen Absorbers; Journal of the Less–Common Metals; 1985; pp. 229–239; 106; Elsevier Sequoia, The Netherlands, (no month).

S. Bouaricha, J.P. Dodelet, D. Guay, J. Huot, S. Boily, R. Schulz; Effect of carbon–containing compounds on a hydriding behavior of nanocrystalline $Mg_2Ni$; Journal of Alloys and Compounds; 2000; pp. 226–233; 307; Elsevier Science S.A. (no month).

* cited by examiner

Primary Examiner—Wayne A. Langel
(74) Attorney, Agent, or Firm—Foley & Lardner

(57) ABSTRACT

Disclosed is a method for rapidly carrying out a hydrogenation of a material capable of absorbing hydrogen. It was discovered that when a powder of a material capable of absorbing hydrogen is ground under a hydrogen pressure, not at room temperature but at a higher temperature (about 300° C. in the case of magnesium) and in the presence of a hydrogenation activator such as graphite and optionally a catalyst, it is possible to transform completely the powder of this material into a hydride. Such a transformation is achieved in a period of time less than 1 hour whereas the known methods call for periods of time as much as 10 times longer. This is an unexpected result which gives rise to a considerable reduction in the cost of manufacture of an hydride, particularly $MgH_2$.

18 Claims, No Drawings

METHOD OF RAPIDLY CARRYING OUT A HYDROGENATION OF A HYDROGEN STORAGE MATERIAL

FIELD OF THE INVENTION

The present invention relates to a method for rapidly carrying out a hydrogenation of a hydrogen storage material.

BRIEF DESCRIPTION OF THE PRIOR ART

It is known that the hydrogenation of a material capable of absorbing hydrogen and more specifically the first hydrogenation thereof, can be very difficult to carry out, since there is usually a natural oxide at the surface of a material, which acts as a barrier to the penetration of hydrogen. Therefore, one must break down this barrier to hydrogenate the material for a first time. Thereafter, the second and subsequent hydrogenations are carried out much more easily.

The first hydrogenation that is carried out to break the oxide coating at the surface of the material is called "activation". Such activation is usually achieved by exposing the hydrogen storage material to a high temperature, typically several hundred degrees Celsius under a high hydrogen pressure, typically from 15 to 50 bars. The lower are the temperature and the pressure required for the hydrogenation, the easier is the activation and the shorter is the hydrogenation time.

One of the hydrogen storage materials that is particularly difficult to activate, is magnesium. Many researchers have tried for years to rapidly produce magnesium hydride at low cost, starting from metallic magnesium, but without great success.

The most conventional method of hydrogenation of a magnesium powder is described as follows in the article of E. BARTMANN et al, Chem. Ber. 123 (1990) 1517, at page 1523:

<<Mg powder was placed into a steel autoclave fitted with a glass vessel. The autoclave was evacuated twice and pressurized with 3 bars H$_2$. The hydrogen pressure was increased to 5 bars, and the autoclave heated to 345° C. and at that temperature the H$_2$ pressure was then increased to 15 bars and maintained constant until completion of hydrogenation (≡24 h).>>

The extreme conditions used in this conventional method have led researchers to experiment the use of catalysts to facilitate a first hydrogenation of magnesium.

In U.S. Pat. No. 5,198,207 of 1993 in the name of TH. GOLDSCHMIDT AG, column 1, lines 38–45, it is described that the doping of magnesium with other metals such as aluminium, indium, iron, etc has been already used to catalyze the hydrogenation of magnesium, but without great success. As an alternative, U.S. Pat. No. 5,198,207 suggests to add to the magnesium a small amount of magnesium hydride, typically higher than 1.2% by weight, in order to catalyze the hydrogenation of magnesium at temperatures above 250° C. under a pressure ranging between 5 and 50 bars. According to what is disclosed in the patent, this technique called "autocatalysis" permits to complete the hydrogenation in a period of time longer than 7 hours (see column 3).

All the known methods described hereinabove consist in subjecting the magnesium to a high hydrogen pressure at a high temperature to produce magnesium hydride. However, it has been discovered that it is possible to produce a magnesium hydride at room temperature by carrying out a mechanical alloying consisting in subjecting a magnesium powder to an intense mechanical grinding in presence of hydrogen under pressure. In an article entitled "Formation of metal hydrides by mechanical alloying" and published in *J. of Alloys and Compounds,* 217 (1994), 181, Y. CHEN et al. have demonstrated that after 47½ hours of intensive grinding of a magnesium powder under a hydrogen pressure of 240 kPa (about 2.4 bars), a large amount of magnesium is converted to magnesium hydride. However, the time period required to complete the hydrogenation is very long. In an article entitled "Synthesis of Magnesium and Titanium Hydride via Reactive Mechanical Alloying" and published in the *Journal of Alloys and Compounds,* 298 (2000) 279, J. L. BOBET et al. have conducted the same type of experiments with a mechanical alloying except they added to the magnesium in the crucible of the grinder, a catalyst made of a 3d transition metal, such as cobalt. These authors have discovered that only 35% of magnesium hydride is formed after 5 hours when magnesium is ground alone in the presence of hydrogen, but this percentage is increased up to 47% within the same period of time when cobalt is added as a catalyst. However, even when cobalt is used as a catalyst, only 71% of hydride is formed after 10 hours of grinding.

In an article entitled "Hydriding-dehydriding behaviour of magnesium composites obtained by mechanical grinding with graphite carbon" and published in the *International Journal of Hydrogen Energy,* 25 (2000) 837–843, H. IMAMURA et al. have also shown that if magnesium powder is ground with graphite in presence of cyclohexane (CH) or tetrahydrofuran (THF) with or without a catalyst (Pd), the obtained composite (Mg/C or Mg/C/Pd) CF or THF is hydrogenated more rapidly than magnesium alone when, after grinding, the mixture is exposed to a hydrogen pressure of 66.7 kPa (about 0.7 bars) at 180° C. The Mg ground with graphite alone, that is, without the presence of CH of THF, results in a composite that is not very reactive and only absorbs 5% of hydrogen in 20 hours. However, when the grinding of Mg is carried out with graphite in presence of cyclohexane, 80% of Mg is converted into hydride after 20 hours of grinding.

Table 1 summarizes all the experiments disclosed in the prior art for use to produce magnesium hydride starting from a powder of metallic Mg.

TABLE 1

| Method | Hydrogen Pressure | Temperature | Hydrogenation time | Percentage of hydride formed during the reaction |
|---|---|---|---|---|
| (1) Hydrogenation at high temperature and high pressure | 15 bars | 345° C. | 24 h | ≅100% |
| (2) Hydrogenation at high temperature and high pressure with a catalyst (MgH$_2$ autocatalysis) | 5 bars | 350° C. | >7 h | ≅100% |
| (3) Grinding under hydrogen atmosphere without catalyst | 2.4 bars | Room temperature | 47.5 h | ≅100% |
| (4) Grinding under hydrogen atmosphere with catalyst (Co) | 10 bars | Room temperature | 10 h | ≅70% |
| (5) Grinding with graphite followed by an hydrogenation at high temperature | ≅1 bar | 180° C. | 20 h | 5% |

TABLE 1-continued

| Method | Hydrogen Pressure | Temperature | Hydrogenation time | Percentage of hydride formed during the reaction |
|---|---|---|---|---|
| (5) Grinding with graphite in the presence of cyclohexane followed by an hydrogenation at high temperature | ≈1 bar | 180° C. | 20 h | 80% |

(1) Conventional method with no catalyst
(2) U.S. Pat. No. 5.198.207
(3) Article of Y. CHEN et al
(4) Article of J.L. BOBET et al
(5) Article of H. IMAMURA et al In view of what is summarized in Table 1, one can see that to completely convert a powder of magnesium into magnesium hydride, at least 10 hours are typically required whatever be the method that is used. In view of the strategic importance of magnesium as a hydrogen storage material, it would be very interesting, from a technical standpoint, to provide a method that would significantly reduce the time of manufacture of magnesium hydride.

This is particularly important especially in view of the content of Applicant's international patent application WO 99/2422 published in Apr. 29, 1999, which discloses a process for the preparation of a nanocomposite for the storage of hydrogen comprising the step of subjecting to an intensive mechanical grinding a magnesium hydride or an hydride of a Mg-based compound and one or more elements or compounds that are known to absorb hydrogen and to be not miscible with magnesium during grinding. Indeed, this process requires the use of magnesium hydride as starting material.

Of course, one may easily understand the importance of a method that would facilitate the hydrogenation of a material capable of absorbing hydrogen, and would apply not only to magnesium but to any other material currently used for hydrogen storage.

SUMMARY OF THE INVENTION

It has now been discovered that by suitably coupling three of the methods of hydrogenation previously mentioned, one may obtain a completely unexpected synergistic effect which permits to considerably reduce the time required for the preparation of an hydride. More precisely, it has been discovered that when a powder of a material capable of absorbing hydrogen is subjecting to intense mechanical grinding under hydrogen pressure not at room temperature but at a higher temperature (of about 300° C. in the case of Mg) in the presence of an hydrogenation activator such as graphite, and optionally a catalyst, it is possible to completely transform the powder of said material into the corresponding hydride in less than one hour, whereas the above prior art methods are 10 times longer. This is of course an unexpected result, which is extraordinary and results in a considerable reduction in the cost of manufacture of a hydride, in particular $MgH_2$.

Thus, the present invention is directed to a method for carrying out rapidly a hydrogenation of a hydrogen storage material, which combines three of the above methods previously used separately for hydrogenating a hydrogen storage material, namely:

1) the conventional method wherein the hydrogenation is carried out at high temperature and high pressure;
2) the method wherein the hydrogenation is carried out by grinding under a hydrogen atmosphere with or without additives; and
3) the method wherein the material is ground with a hydrogenation activator such as graphite and thereafter hydrogenated at high temperature.

More precisely, the invention as claimed hereinafter is directed to a method for rapidly carrying out the hydrogenation of a hydrogen storage material wherein the material is subjected to an intense mechanical grinding in the presence of an hydrogenation activator under a hydrogen pressure and at a temperature higher than the room temperature.

In the present description and the appended claims, the expression "hydrogenation activator" means any solid, liquid or gaseous material which, when it is applied to the surface of the hydrogen storage material to be hydrogenated by mechanical grinding, permits to protect the surface of said hydrogen storage material against contamination and thus avoids the risks of unwanted oxidation or reaction other than hydrogenation and which, at the same time, permits infiltration of hydrogen and thus acceleration of the hydrogenation at high temperature. The activator may also reduce agglomeration and cold welding of particles during milling and it may facilitate powder compaction after manufacture. As an example of a particularly efficient hydrogenation activator, reference can be made to graphite. As other examples of hydrogenation activators, reference can be made to hydrocarbons such as naphthalene ($C_{10}H_8$), perylene ($C_{20}H_{12}$), pentacene ($C_{22}H_{14}$), adamantane ($C_{10}H_{16}$) and anthracene ($C_{14}H_{10}$). Reference can also be made to fullerene (C60); vulcan; organic liquids; polymeric solids.

A non-restrictive, more detailed description of the invention will now be given.

DETAILED DESCRIPTION OF THE INVENTION

As indicated hereinabove, the method according to the invention for rapidly carrying out a hydrogenation of a hydrogen storage material, consists in subjecting the material to a mechanical grinding in the presence of a hydrogenation activator under a hydrogen pressure and at a temperature higher than the room temperature.

By "hydrogen storage material", there is meant any element, alloy, solid solution, liquid solution or complex hydride known to be capable of absorbing hydrogen in order to store it, transport it and/or produce it. This material can belong to any one of the following non-limitative groups.

1) Elements selected from the group consisting of Li, Be, B, Na, Mg, Al, Si, K, Ca, Sc, Ti, V, Cr, Mn, Ni, Cu, Zn, Ga, Rb, Sr, Y, Zr, Nb, Pd, Cs, Ba, La, Hf, Ta, Ce, Pr, Nd, Sm, Gd, Tb, Dy, Ho, Er, Tm, Yb, Lu, Ac, Th and U.
2) Alloys of the $AB_5$ type, in which:
A is at least one element selected from the group consisting of La, Ca, Y, Ce, Mm, Pr, Nd, Sm, Eu, Gd, Yb and Th
B is at least one element selected from the group consisting of Ni, Al, Co, Cr, Cu, Fe, Mn, Si, Ti, V, Zn, Zr, Nb, Mo and Pd
3) Alloys of the $AB_2$ type in which:
A is at least one element selected from the group consisting of Ca, Ce, Dy, Er, Gd, Ho, Hf, La, Li, Pr, Sc, Sm, Th, Ti, U, Y and Zr; and
B is at least one element selected from the group consisting of Ni, Fe, Mn, Co, Al, Rh, Ru, Pd, Cr, Zr, Be, Ti, Mo, V, Nb, Cu and Zn.

4) Alloys of the AB type in which:
   A is at least one element selected from the group consisting of Ti, Er, Hf, Li, Th, U and Zr; and
   B is at least one element selected from the group consisting of Fe, Al, Be, Co, Cr, Mn, Mo, Nb and V.
5) Alloys of the $A_2B$ type in which:
   A is at least one element selected from the group consisting of Hf, Mg, Th, Ce, Al, Ti and Zr; and
   B is a combination of Ni, Co, Fe, Al, Be, Cu, Cr, V, Zn and Pd.
6) Alloys of the $AB_3$ type in which:
   A is at least one element selected from the group consisting of Ce, Dy, Er, Gd, Ho, Lu, Nd, Sm, Tb, Th, Ti, U and Y; and
   B is at least one element selected from the group consisting of Co, Ni, Fe, Mn, Cr and Al.
7) Alloys of the $A_2B_7$ type in which:
   A is at least one element selected from the group consisting of Ce, Dy, Er, Gd, La, Nd, Pr, Tb, Th and Y; and
   B is at least one element selected from the group consisting of Co, Ni, Fe and Mn.
8) Solid solutions where the solvent is an element selected from the group consisting of Pd, Ti, Zr, Nb and V.
9) Complex hydride of transition metals selected among those comprising at least one of the following complex structures: $[ReH_9]^{2-}$, $[ReH_6]^{5-}$, $[FeH_6]^{4-}$, $[RuH_6]^{4-}$, $[Ru_2H_6]^{12-}$, $[RuH_4]_n$, $[CoH_5]^{4-}$, $[CoH_4]^{5-}$, $[NiH_4]^{4-}$, $[PdH_3]^{3-}$, et $[ZnH_4]^{2-}$,
10) Complex hydride selected from the family of hydrides of the general formula $A(BH_4)_n$ in which A is a metal (typically of group IA or IIA) with a valence n and B is a metal of group IIIB (typically B, Al or Ga).
11) Alloys of the BCC type as described in U.S. Pat. No. 5,968,291.

By "hydrogen pressure", there is meant an hydrogenated atmosphere preferably maintained under a pressure higher than or equal to 1 bar.

By "temperature higher than the room temperature", there is meant a temperature that is preferably equal to or higher than 50° C. Of course, this temperature can vary within a broad range depending on the nature of the selected material. In the case of magnesium known to be difficult to hydrogenate, this temperature will preferably be of about 300° C.

Preferably, the mechanical grinding is carried out in a closed enclosure with a mechanical energy superior or equal to 0.05 kW/liter. This grinding can be carried out with any type of conventional grinders, such as a SPEX 8000, FRITCH or ZOZ grinder.

In practice, the hydrogenation activator must be used in a sufficient amount to obtain the desired effect. In the particular case of magnesium, a minimal amount of 1% by weight of graphite seems to be required. Excellent results are obtained with 3% by weight of graphite (see the following examples). The determination of the optimal amount of hydrogenation activator to be used can easily be carried out and is obvious for anyone skilled in the art, as a function of the selected material to be hydrogenated.

According to a preferred embodiment of the invention, the mechanical grinding can be carried out in the presence of a catalyst. In this connection, one may refer to the contents of the numerous-patents obtained by the Applicant in this field (see in particular international applications numbers WO 96/23906, WO 97/26214; WO 99/20422 and WO 00/18530). As examples of catalysts, reference can be made by Pd, Ni, Pt, Ir, Rh, V, etc. Preferably, use will be made of vanadium for the hydrogenation of Mg.

As is shown in Table 1 hereinabove, one of the shortest times that has ever been obtained for the hydrogenation of magnesium as a hydrogen storage material is of about 7 hours (see the U.S. patent of T H. GOLDSMITH). Moreover, all the articles mentioned hereinabove that describe the step of grinding magnesium prior to subjecting it to hydrogenation at a high temperature, mention an hydrogenation time of 20 hours. In accordance with the present invention, it has been discovered that when the hydrogenation of magnesium at high temperature is carried out simultaneously with a grinding thereof with graphite under a hydrogen pressure as low as 4 bars, this hydrogenation time, formerly of 20 hours, is significantly reduced to less than 1 hour. Such was a priori not obvious and demonstrates the existence of a synergistic effect.

EXAMPLE 1

Using the method according to the invention, three tests were carried out in order to obtain a first hydrogenation of magnesium using 5% at. of V as a catalyst. These three tests were respectively carried out with 3%, 1% and 0.3% by weight of graphite, as an hydrogenation activator. All the grindings were carried out for 1 hour at 300° C. under 4 bars of hydrogen.

With 3% by weight of graphite, the transformation of Mg into $MgH_2$ was almost complete.

With 1% by weight of graphite, the transformation of Mg into $MgH_2$ was achieved but the amount was much lower.

With 0.3% by weight of graphite, the powder of magnesium agglomerated in little balls and there was no formation of hydride.

Thus, in the case of magnesium, the lower limit of the amount of hydrogenation activator to be used seems to be 1% by weight in the case of graphite.

Comparative Example 1

In order to verify the importance of using graphite in the method according to the invention, a comparative test was carried out with the same material as in example 1 (Mg+V at. %) under the same conditions (1 hour at 300° C. under 4 bars of hydrogen), but without graphite.

During this test, only a very small amount of hydride was produced. In fact, the powder agglomerated and formed little balls of magnesium like in the case of example 1 with 0.3% of graphite.

Therefore, the use of a minimum of at least 1% by weight of graphite seems to be essential to obtain good results with magnesium.

Comparative Example 2

In order to verify the importance of carrying out the grinding at a temperature higher than the room temperature, another comparative test was carried out with the same material as in example 1 (Mg+V 5% at) in the presence of 3% by weight of graphite. The grinding was carried out under a pressure of 4 bars of hydrogen, but at room temperature rather than at 300° C.

Even after 2 hours, no transformation of magnesium into hydride was detected. This confirms that it is necessary to grind the material under hot conditions.

EXAMPLE 2

By using the method according to the invention, three tests were carried out to obtain a first hydrogenation of magnesium with 5% at. of vanadium as a catalyst.

These tests were carried out with 3% by weight of graphite at 300° C. under 4 bars of hydrogen, for periods of time of 30 min., 1 hour and 2 hours, respectively.

The determination of the amount of hydride formed during the grinding was made by X-ray diffraction. After ½ hour, more than 50% of the magnesium was transformed into Mg hydride β-MgH$_2$. After 1 hour, more than 95% of the magnesium was transformed into β-MgH$_2$. We also detected that in either one of the cases, traces of metastable Mg hydride γ-MgH$_2$. After 2 hours, the obtained result was similar to the one obtained after 1 hour. However, there was a larger amount of metastable MgH$_2$ (γ-MgH$_2$) due to the intensive mechanical grinding of the β-MgH$_2$ phase.

The amounts of hydrides thus obtained are reported in Table 2 below.

TABLE 2

| | Hydrogen Pressure | Temperature | Hydrogenation time | Percentage of hydride formed during the grinding |
|---|---|---|---|---|
| Grinding under hydrogen at high temperature with graphite and a catalyst | 4 bars | 300° C. | 30 min. | ≅64% |
| Grinding under hydrogen at high temperature with graphite and a catalyst | 4 bars | 300° C. | 1 h | ≅100% |
| Grinding under hydrogen at high temperature with graphite and a catalyst | 4 bars | 300° C. | 2 h | ≅100% |

EXAMPLE 3

By using the method according to the invention, a test was carried out to obtain a first hydrogenation of pure Mg without a catalyst. This test was carried out with 3% by weight by graphite at a temperature of 300° C. under a hydrogen pressure of 4 bars.

After 2 hours of grinding, the hydrogenation was not complete. There was still some metallic magnesium that was not hydrogenated. However, in the presence of vanadium, all the magnesium was hydrogenated after 1 hour.

Thus, the use of a catalyst seems to help hydrogenation. However, even without vanadium, the reaction of hydrogenation at high temperature under hydrogen atmosphere in the presence of graphite under mechanical action is much more rapid than the reaction that was ever tested so far in the prior art.

EXAMPLE 4

To prove the applicability of the method according to the invention on other types of materials, tests were carried out to obtain a first hydrogenation of a mixture of sodium hydride and aluminium.

By carrying out the grinding of a NaH+Al system with 3% by weight of graphite at 140° C. for 9 hours under 12 bars of hydrogen, β-Na$_3$AlH$_6$ was formed. Thus, the method according to the invention also applies to systems other than magnesium.

By carrying out the grinding of a 3 NaH+Al system with 3% by weight of graphite during 14 hours under 12 bars of hydrogen at 140° C., the transformation of the starting system into β-Na$_3$AlH$_6$ was not complete. In fact, the reaction turned out to be slower than for the system NaH+Al.

By carrying out the same type of grinding as previously described (that is, with a 3 NaH+Al system during 14 hours under 12 bars of hydrogen at 140° C.) but with 6% by weight of graphite as compared to 3%, the transformation turned out to be almost complete. This is exceptional inasmuch as it is known that this first hydrogenation of a mixture of NaH and Al is known to be extremely difficult to carry out (see for example A. Zaleska et al., *J. of Alloys and Compounds*, 298(2000) 125.)

The above results confirm that the presence of graphite is essential but the percentage of graphite to be used can be optimised as a function of the nature of the material or system to be hydrogenated. As previously described, this optimization is easy and obvious for any one skilled in the art.

EXAMPLE 5

To prove that there are materials other than graphite that have a beneficial effect similar to graphite for favorising the hydrogenation reaction and thus can be used as hydrogenation activators, a test was carried out in order to obtain a first hydrogenation of Mg+V5% at. with perylene.

A mixture containing 1.002 g of Mg, 0.099 g of V and 0.031 g of perylene was ground for 2 hours at 250° C. under a pressure of hydrogen of 10 bars. The X-ray diffraction spectrum obtained after the grinding has shown that a complete hydrogenation was achieved.

This clearly demonstrates that the present invention can be broadened to encompass other hydrogenation activators, such as naphtalene, fullerene, vulcan, pentacene and/or adamantane.

EXAMPLE 6

To prove that the hydrogenation activator may be in a form other than solid, a test was carried out to obtain a hydrogenation of Mg with anthracene. A mixture containing 0,900 g of Mg and 0,100 g of anthracene was ground for 1 hour at 300° C. (a temperature at which anthracene is liquid) under a pressure of hydrogen of 4 bars. The X-ray diffraction spectrum obtained after grinding has shown that 40% of the material has been transformed into magnesium hydride.

This demonstrates that the present invention can be broadened to encompass hydrogenation activators which are not in a solid form, for instance liquid hydrocarbons such as anthracene at elevated temperatures.

What is claimed is:

1. A method for rapidly carrying out hydrogenation of a hydrogen storage material, comprising:

the step of subjecting said material to a mechanical grinding in the presence of a hydrogenation activator, under hydrogen pressure and controlling the temperature so as to maintain a temperature higher than the room temperature;

wherein the mechanical grinding is carried out within an enclosure with a mechanical energy equal to or higher than 0.05 kW/liter.

2. The method according to claim 1, wherein the hydrogen pressure is equal to or higher than 1 bar.

3. The method according to claim 2, wherein the temperature is equal to or higher than 50° C.

4. The method according to claim 1, wherein the material is magnesium.

5. The method according to claim 4, wherein the hydrogen pressure is equal to about 4 bars and the temperature is equal to about 300° C.

6. The method according to claim 1, wherein the mechanical grinding is carried out in the presence of a catalyst.

7. The method according to claim 6, wherein the catalyst consists of vanadium and is present in an amount equal to or higher than 1% at.

8. The method according to claim 1, wherein the hydrogenation activator is a hydrocarbon.

9. The method according to claim 1, wherein the hydrogenation activator is selected from the group consisting of naphthalene, perylene, pentacene, adamantane, fullerene and vulcan.

10. The method according to claim 1, wherein said material contains sodium and aluminum.

11. A method for rapidly carrying out hydrogenation of a hydrogen storage material, comprising:
the step of subjecting said material to a mechanical grinding in the presence of a hydrogenation activator, under hydrogen pressure and controlling the temperature so as to maintain a temperature higher than the room temperature;
wherein the hydrogen pressure is equal to or higher than 1 bar;
wherein the temperature is equal to or greater than 50° C.;
wherein the mechanical grinding is carried out within an enclosure with a mechanical energy equal to or higher than 0.05 kW/liter; and wherein the hydrogenation activator is graphite.

12. The method according to claim 11, wherein the graphite is used in an amount equal to or higher than 1% by weight.

13. The method according to claim 12, wherein the graphite is used in an amount equal to or higher than 3% by weight.

14. A method for rapidly carrying out hydrogenation of a hydrogen storage material, comprising:
the step of subjecting said material to a mechanical grinding in the presence of a hydrogenation activator, under hydrogen pressure and controlling the temperature so as to maintain a temperature higher than the room temperature;
wherein the mechanical grinding is carried out within an enclosure with a mechanical energy equal to or higher than 0.05 kW/liter;
wherein the material is magnesium;
wherein the hydrogen pressure is equal to about 4 bars and the temperature is equal to about 300° C.; and
wherein the hydrogenation activator is graphite and is used in an amount equal to or higher than 1% by weight.

15. The method according to claim 14, wherein the mechanical grinding is carried out in the presence of a catalyst.

16. A method for rapid hydrogenation of a hydrogen storage material, comprising the step of subjecting the storage material to an intensive mechanical grinding in the presence of a hydrogenation activator and under hydrogen pressure and controlling the temperature so as to maintain a temperature higher than room temperature,
wherein the mechanical grinding is carried out within an enclosure with a mechanical energy equal to or higher than 0.05 kW/liter, and
wherein the hydrogenation activator is graphite.

17. A method for rapid hydrogenation of a hydrogen storage material, comprising the step of subjecting the material to an intensive mechanical grinding in the presence of a hydrogenation activator and under hydrogen pressure and controlling the temperature so as to maintain a temperature higher than room temperature,
wherein the mechanical grinding is carried out within an enclosure with a mechanical energy equal to or higher than 0.05 kW/liter, and
wherein the material is magnesium.

18. A method, for rapid hydrogenation of a hydrogen storage material, comprising the step of subjecting the storage material to an intensive mechanical grinding in the presence of a hydrogenation activator and under hydrogen pressure and controlling the temperature so as to maintain a temperature higher than room temperature,
wherein the mechanical grinding is carried out within an enclosure with a mechanical energy equal to or higher than 0.05 kW/liter, and
wherein the storage material contains sodium and aluminum.

\* \* \* \* \*